US012809665B2

(12) United States Patent
Burger et al.

(10) Patent No.: US 12,809,665 B2
(45) Date of Patent: Nov. 24, 2026

(54) FLEXIBLE UPDATE MECHANISM FOR STATEFUL APPLICATIONS

(71) Applicant: ABB Schweiz AG, Baden (CH)

(72) Inventors: Andreas Burger, Weingarten (DE); Heiko Koziolek, Karlsruhe (DE); Pablo Rodriguez, Ilvesheim (DE); Julius Rueckert, Langen (DE)

(73) Assignee: ABB Schweiz AG, Baden (CH)

( * ) Notice: Subject to any disclaimer, the term of this patent is extended or adjusted under 35 U.S.C. 154(b) by 707 days.

(21) Appl. No.: 17/729,568

(22) Filed: Apr. 26, 2022

(65) Prior Publication Data

US 2022/0350644 A1 Nov. 3, 2022

(30) Foreign Application Priority Data

Apr. 29, 2021 (EP) .................................... 21171164

(51) Int. Cl.

*G06F 9/48* (2006.01)
*G06F 9/46* (2006.01)
*G06F 9/50* (2006.01)

(52) U.S. Cl.

CPC ............ *G06F 9/4856* (2013.01); *G06F 9/461* (2013.01); *G06F 9/466* (2013.01); *G06F 9/5088* (2013.01)

(58) Field of Classification Search

CPC ........ G06F 9/4856; G06F 9/461; G06F 9/466; G06F 9/5088

(Continued)

(56) References Cited

U.S. PATENT DOCUMENTS 7,480,909 B2 * 1/2009 McKean .................. G06F 9/52 711/100
9,008,023 B2 * 4/2015 Khay-Ibbat ........... H04W 68/00 370/329

(Continued)

FOREIGN PATENT DOCUMENTS

CN 111917812 A 11/2020
EP 1876530 A1 1/2008

(Continued)

OTHER PUBLICATIONS

Benjaponpitak et al., "Enabling Live Migration of Containerized Applications Across Clouds," *IEEE INFOCOM 2020—IEEE Conference on Computer Communications*, pp. 2529-2538 (Jul. 6, 2020).

(Continued)

*Primary Examiner* — Hiren P Patel
*Assistant Examiner* — Ross Michael Vincent
(74) *Attorney, Agent, or Firm* — Fitch Even Tabin & Flannery LLP

(57) ABSTRACT

A computer-implemented update management method for managing transfer of an application state from a source node to at least one target node of a distributed control system, includes identifying a first part of the application state which can be transferred independently of a second part of the application state; determining that the first part can be transferred from the source node to the at least one target node during one execution cycle of the application; performing a first partial update by transferring the first part of the application state from the source node to the at least one target node during a first execution cycle of the application; and performing a second partial update by transferring the second part of the application state from the source node to (Continued)

the at least one target node during a second, subsequent execution cycle of the application.

20 Claims, 10 Drawing Sheets

(58) Field of Classification Search
USPC ........................................................... 718/102
See application file for complete search history.

(56) References Cited

U.S. PATENT DOCUMENTS

| | | | | |
|---|---|---|---|---|
| 9,507,630 | B2 | 11/2016 | Addepalli et al. | |
| 9,582,261 | B2 | 2/2017 | Singh et al. | |
| 9,621,631 | B2 | 4/2017 | Zises | |
| 9,813,520 | B2 | 11/2017 | Erickson | |
| 10,031,489 | B2 | 7/2018 | Nixon et al. | |
| 10,268,508 | B1 | 4/2019 | Hauser et al. | |
| 2005/0021883 | A1* | 1/2005 | Shishizuka | H04N 1/32358 710/20 |
| 2005/0273773 | A1* | 12/2005 | Gold | G06F 8/34 717/139 |
| 2006/0015849 | A1 | 1/2006 | Polozoff | |
| 2009/0064112 | A1* | 3/2009 | Inagaki | G06F 8/441 717/140 |
| 2011/0047554 | A1* | 2/2011 | Lakshmanan | G06F 9/505 718/105 |
| 2011/0173622 | A1* | 7/2011 | Shin | G06F 9/4856 718/102 |
| 2011/0258246 | A1* | 10/2011 | Khandekar | G06F 9/5027 709/201 |
| 2018/0074748 | A1* | 3/2018 | Makin | G06F 9/4856 |
| 2018/0101218 | A1* | 4/2018 | Chou | G06T 1/20 |
| 2019/0324786 | A1* | 10/2019 | Ranjan | G06F 9/45558 |
| 2020/0195522 | A1* | 6/2020 | Lau | H04L 41/5025 |
| 2020/0230499 | A1* | 7/2020 | Buser | H04L 43/04 |
| 2020/0272672 | A1* | 8/2020 | Orlov | G06F 16/958 |
| 2020/0351716 | A1* | 11/2020 | Zu | H04L 5/0044 |
| 2021/0004163 | A1* | 1/2021 | Xu | G06F 3/065 |
| 2021/0004262 | A1* | 1/2021 | Gupta | G06F 9/45558 |
| 2021/0097184 | A1* | 4/2021 | Rao | G06F 21/51 |
| 2021/0109778 | A1 | 4/2021 | Keating et al. | |
| 2021/0243832 | A1* | 8/2021 | Teyeb | H04W 76/18 |
| 2021/0326286 | A1* | 10/2021 | Ware | G06F 13/4027 |
| 2021/0360083 | A1* | 11/2021 | Duggal | H04L 67/34 |
| 2023/0367629 | A1* | 11/2023 | Götz | G06F 9/44505 |
| 2024/0289232 | A1* | 8/2024 | Mandal | G06F 11/1461 |

FOREIGN PATENT DOCUMENTS

| | | | | |
|---|---|---|---|---|
| EP | 3702916 | A1 | 9/2020 | |
| WO | WO 2007/100292 | A1 | 9/2007 | |
| WO | WO-2012119436 | A1 * | 9/2012 | G06F 9/4856 |

OTHER PUBLICATIONS

Lo et al., "A Case Study of Dynamic Application Partitioning in Mobile Computing—An E-mail Browser," *Workshop on Object Replication and Mobile Computing of OOPSLA*, 6 pp. (Oct. 1996).
European Patent Office, Extended European Search Report in European Application No. 21171164.3, 11 pp. (Oct. 22, 2021).
Del Monte et al., "Efficient Migration of Very Large Distributed State for Scalable Stream Processing," *VLDB 2017 PhD Workshop*, 4 pp. (Aug. 28, 2017).
European Patent Office, Office Action in European Patent Application No. 21171164.3, 12 pp. (Oct. 30, 2025).
Office Action issued in corresponding Chinese Application No. 202210446456.5; date mailed: May 21, 2026; in Chinese with English machine translation (22 pages).

* cited by examiner

FLEXIBLE UPDATE MECHANISM FOR STATEFUL APPLICATIONS

CROSS-REFERENCE TO RELATED APPLICATIONS

This patent application claims priority to European Patent Application No. 21171164.3, filed on Apr. 29, 2021, which is incorporated herein in its entirety by reference.

FIELD OF THE DISCLOSURE

The present disclosure relates to systems and methods for managing the transfer of an application state of an application from a source node to at least one target node of a distributed control system.

BACKGROUND OF THE INVENTION

In industrial process control systems, control applications are executed to calculate outputs for actuators based on sensor data. Applications need to be flexibly deployed to: 1) optimize the workload/CPU load/memory load in a network-centric architecture of control systems; 2) update control applications and execution engines; 3) test changes in the control application/execution engine. Stopping an application for an update is undesirable to avoid disruption to the underlying production process, especially in case of minor adjustments to the control code. Stops are inevitable if cycle times during the update cannot be guaranteed. Meeting cycle times is therefore a hard requirement. Moreover, if application instances are executing on different nodes, the state must be transferred via a network, which introduces additional delays in the state transfer process. As a result, it is possible that the cycle time of an application cannot be met.

BRIEF SUMMARY OF THE INVENTION

There is need for a more flexible update mechanism for stateful applications. This need is met by the subject-matter of the independent claims. Optional features are set forth by the dependent claims.

According to one aspect, there is provided a computer-implemented update management method for managing the transfer of an application state of an application from a source node to at least one target node of a distributed control system. The method comprises identifying a first part of the application state which can be transferred independently of a second part of the application state; determining that the first part can be transferred from the source node to the at least one target node during one execution cycle of the application; performing a first partial update by transferring the first part of the application state from the source node to the at least one target node during a first execution cycle of the application; and performing a second partial update by transferring the second part of the application state from the source node to the at least one target node during a second, subsequent execution cycle of the application.

BRIEF DESCRIPTION OF THE SEVERAL VIEWS OF THE DRAWING(S)

A detailed description will now be given, by way of example only, with reference to the accompanying drawings.

DETAILED DESCRIPTION OF THE INVENTION

Figure 1:
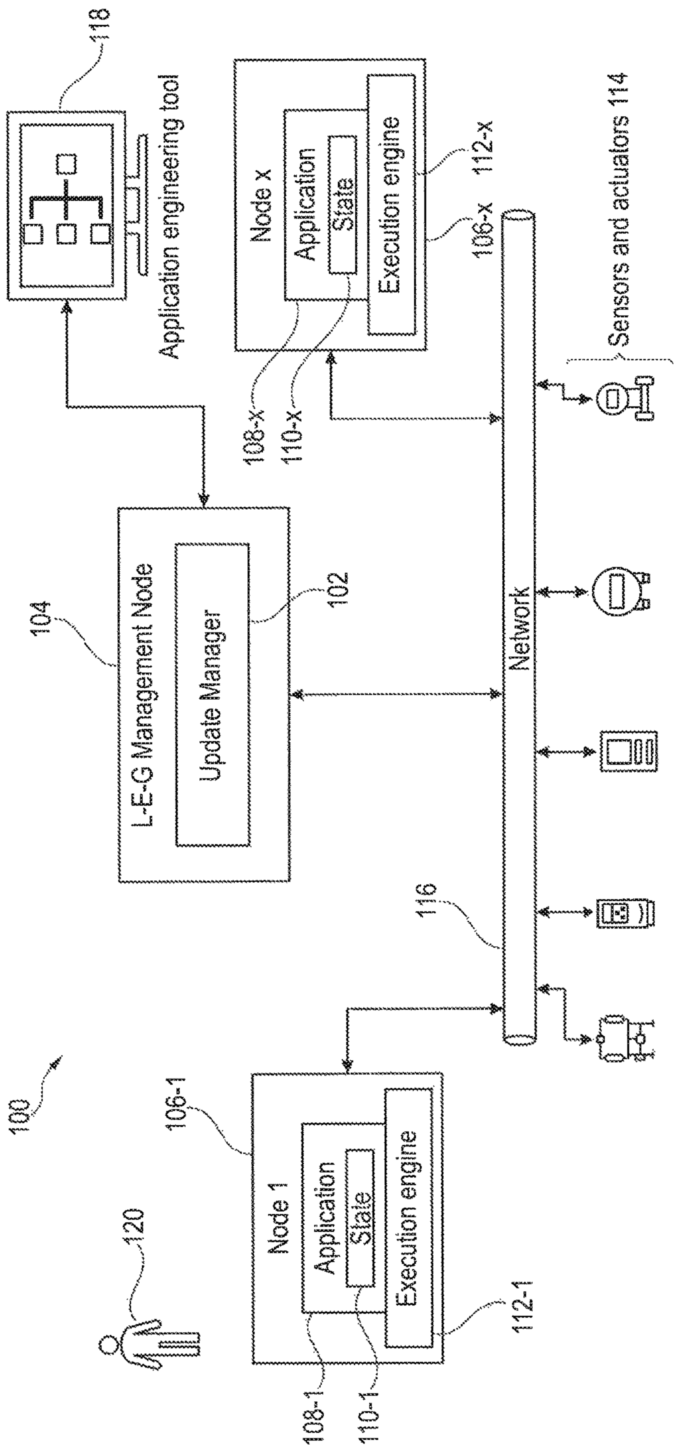
FIG. 1 illustrates a containerized environment in which an update manager manages updates to control applications in accordance with the disclosure.

FIG. 1 shows a distributed control system (DCS) 100 comprising a distributed control node 106-1 running a stateful application 108-1 (that is an application having a state 110-2) on its execution engine 112-1.

The application 108-1 is a program implementing a control algorithm for controlling one or more field devices 114 regulating an industrial process. The field devices 114 may comprise one or more sensors and/or actuators, for controlling for example the temperature and flow in an oil pipeline, the filling level of a chemical reactor, or (as a PID controller) controlling gas flow in a boiler. The field devices 114 are connected to nodes 106 of the DCS 100 via a network 116. The sensors periodically send updated values (e.g., temperature is 70 degrees) as input signals to the application 108-1, while the actuators continuously listen or monitor for output signals from that application 108-1 (e.g., close valve to 20%).

The application 108-1 can be implemented using one of the five IEC 61131-3 programming languages (Structured Text, Function Block Diagrams, Instruction Lists, Sequential Function Charts, Ladder Logic), for example. During execution, the application state 110-1 may comprise values of variables, for example the values of counter variables, intermediate calculations, timers, past executions, function block internal states, etc. As is typical for process automation applications, there may be thousands of variables making up the application state 110-1, which thus may consume large amounts of memory. The application 108-1 may be implemented by an automation engineer using an application engineering tool 118, such as ABB CBM.

The execution engine 112-1 provides a runtime environment capable of cyclic execution of the application 108-1 (e.g., according to IEC 61131-3). The runtime periodically receives the input signals from the respective field device 114 (e.g., once every 1-100 ms), executes the corresponding control algorithm on the input signals thereby to generate output signals, and sends the output signals to that field device 114 using the same cycle time. Fast cycle times for this computation down to 1-10 ms may be necessary for executing the application 108-1.

The need may arise to deploy the application 108-1 to another node. Such deployment may be performed for example to optimize distribution of workload (e.g. CPU load, memory load) across nodes, to update applications or execution engines, or to test changes in the applications or execution engines. As is known in the art, a L-E-G (Load Evaluate and Go) process may be undertaken in which a further application 108-*x*—which may be referred to herein as a deployed or updated application—is run on the execution engine 112-*x* of a target node 106-*x* in parallel with the source application 108-1. The inputs and outputs (I/Os) of the two applications are compared. If the results of the comparison are acceptable, a switchover to the deployed application 108-*x* is triggered. To update the state 110-*x* of the deployed application 108-*x*, the state 110-1 of the source application 108-1 (or a predefined minimal set of that state, so that it is able to produce the same results or intentionally different results in case of logic changes) is transferred over the network 116. The need for this transfer creates the possibility that the cycle time of the application 108 cannot be met due to network delays.

Disclosed herein are systems and methods for updating applications executing on different distributed control nodes of a distributed control system in such a way as to mitigate the effect of network delays on the ability to meet application cycle time.

In particular, FIG. 1 further illustrates an update manager 102 which manages the updates to applications. The update manager 102 is implemented in this example in a software container on a different node called the L-E-G management node 104. The update manager 102 may provide a user interface for interaction with an engineer 120 or other user, for example to display information and to receive user commands. The update manager 102 is configured to perform an update management method.

Figure 2:
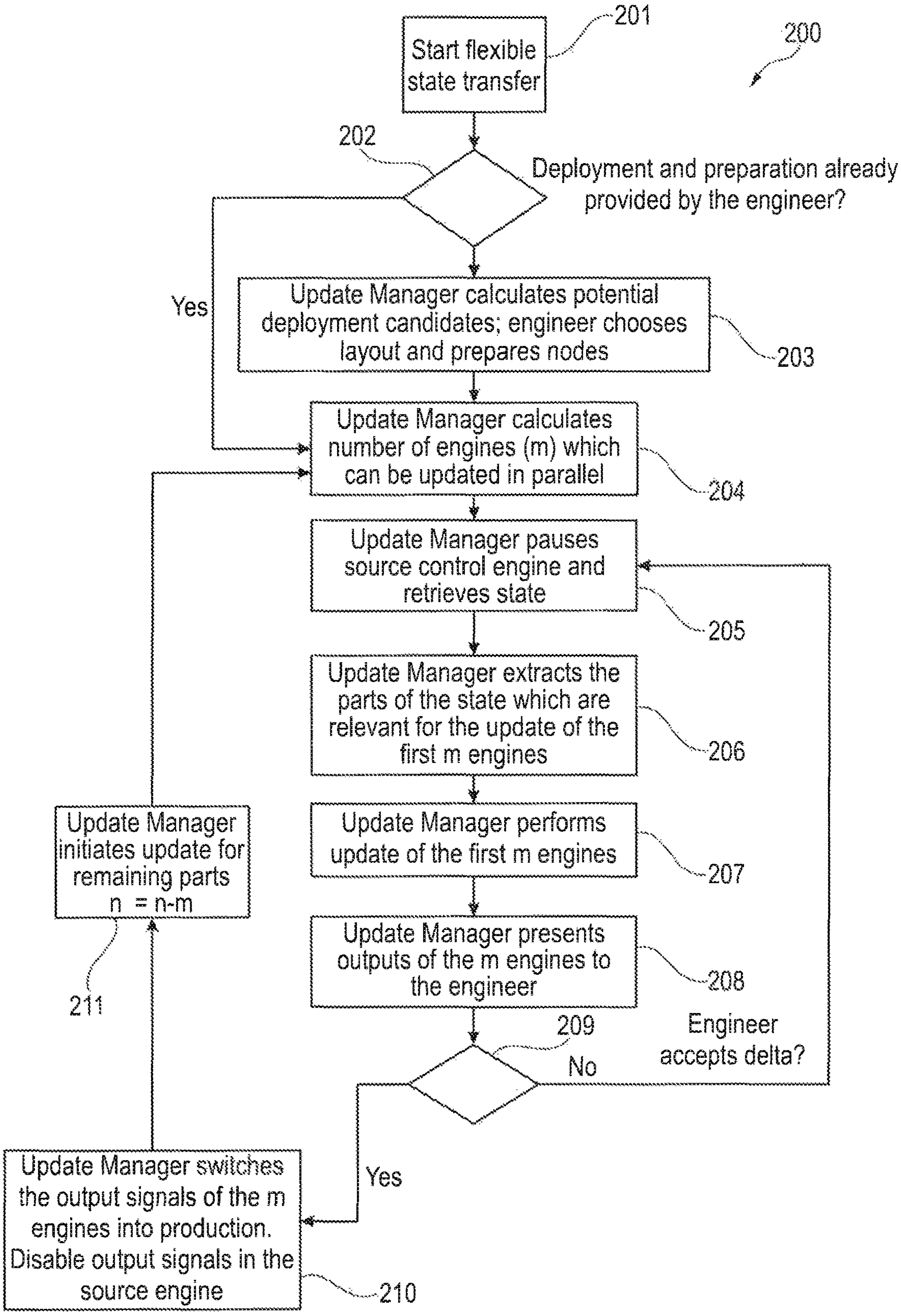
FIG. 2 is flowchart representing an update management method performed by the update manager of FIG. 1.

FIG. 2 illustrates the update management method 200.

In step 201, the update process 200 is initiated for flexibly transferring the state 110-1 of the application 108-1 to one or more target nodes. The update process 200 may be manually initiated by the engineer 120 calling the update manager 102 with an update request. The update request may be a non-specific update request, i.e. one which does not identify any target node, or a specific update request, in which one or more target nodes for the update are specified. Non-specific update requests may be used when the deployment scheme is not yet known. Specific update requests may be used when the deployment scheme has already been determined.

In step 202, the update manager 102 determines whether a deployment scheme has already been provided and implemented by the engineer 120. If so, the method proceeds to step 204. If not, the update manager 102 determines the deployment scheme in step 203.

In step 203, to determine the deployment scheme, the update manager 102 may be configured to obtain engineering data relating to the application 108-1, and to determine, using the engineering data, whether the application 108-1 can be split into a plurality of decoupled parts for deployment to a plurality of target nodes. A decoupled part of an application can for example be a task, a program organizational unit (POU), or any combination of input/output signals and/or function blocks that does not have external dependencies (e.g., to other signals or communication variables), or which has only minimal dependencies. For example, the update manager 102 is configured to obtain static representations of the application 108-1, a static representation being for example structured text or function block diagram representing the application. The update manager 102 is able to obtain this static representation of the control program, if it is not otherwise available, by accessing the application engineering tool 118. The update manager 102 calculates potential splitting points in the control program based on the static representation of the control program. The splitting points may be calculated by using static code analysis approaches, e.g. for structured text, e.g. for 61131 control logic, to identify global variables used by different subsystems, i.e. global variables which are written by one part of the control code and read by another. Those parts may then represent candidates to be split apart. Global variables may be specified explicitly in the control program. These variables may be I/O variables. In a PLC program, global variables are the key mechanism for communication between subsystems. Therefore, by analyzing accesses to global variables, the strength of the coupling between subsystems can be determined. This information can be used to show potential splitting points in the control logic, so as to split the application into the decoupled or isolated parts. The splitting process may require (after the deployment) the use of additional communication variables—to represent the global variables of the control logic program—when the split parts are deployed to different nodes. Performing the static code analysis may comprise using a dependency graph to determine how different parts of the source application 108-1 interact with each other. Isolated clusters may be detected in that graph having no dependency to each other or with a maximum of e.g. one dependency which then can be realized by using an additional communication variable. Further techniques for splitting the application will be apparent to the person skilled in the art.

Following splitting of the application, the update manager 102 is configured to generate one or more different candidate deployment schemes, indicating where to deploy which part of the application, based on the results of the application splitting and optionally also on determined resource restrictions such as compute resource restrictions at potential target nodes or network resource restrictions (with the deployment scheme being selected e.g. to minimize network traffic). To this end, the update manager 102 may be configured to determine target node compute resource restrictions using for example standard benchmark application data. Compute resource restrictions may comprise, for example, at the target node, one or more of CPU utilization, memory (e.g., RAM) availability, jitter, average cycle time, execution priorities, and so on. Network resource restrictions may be determined in the manner described below. According to the present disclosure, the source application 108-1 may be deployed using a 1-to-1 deployment scheme, in which the application is deployed from one node to another (with optional splitting), or a 1-to-n deployment, in which the application is split and deployed from one node to many nodes, i.e., a plurality n of target nodes.

Remaining with step 203 of FIG. 2, the generated candidate deployment schemes are output as options to the engineer 120 to select or confirm. The output to the engineer 120 may indicate which parts of the application, e.g., which parts of the control logic and/or which variables or other parts of the application state, will be transferred to which nodes for a given candidate deployment scheme. Once the scheme has been selected, the receiving nodes (i.e., the target nodes, or more particularly their receiving execution engines) may then be manually or automatically prepared for the deployment and the parts of the application are deployed i.e. uploaded to the receiving nodes. The uploaded parts are then executed in parallel with the source application 108-1.

To avoid information loss and not to complicate refactoring, maintenance or troubleshooting, the changed control logic resulting from the splitting may be stored in the update manager 102 and/or documented in the engineering tool 118. An indication may also be stored as to which part of the application is running on which node. If a 1-to-1 deployment scheme is used, the only update to the engineering tool 118 may include an indication as to which node is executing the deployed application. When a deployment from 1-to-n nodes is implemented, the update manager 102 may provide a link to the engineering tool 118, to write back the changes in the control logic to the original engineering project. This write back may be approved by the engineer 120. The write back process may be performed at the ST (61131) code level. The engineering tool 118 may provide the engineer 120 with a logical view, depicting the connection of signals (as if it would be executed in a single node) and another view, showing the allocation of code on devices (as today is done in CBM for example) and simple switchover between views.

Deploying the application 108-1 to different nodes 106 by splitting it may result in increased network load, owing to the need to exchange information between the different split parts of the source application 108-1. For example, the global variables which were used before to communicate between parts of the application, and which are now represented by the above-mentioned additional communication variables, may give rise to additional signals to be communicated via the network 116. For example, the output of one split part (now executed on a first target node) may become the input of another split part (now executed on a second target node). Such additional signals may be published within the network and other split parts of the application, now running on different nodes, may subscribe to them, following the Pub/Sub concept. The update manager 102 may be configured determine the increase in network load resulting from splitting the application, for example on the basis of which variables are written from which split part of the source application and which are read from other split parts of the application. For example, the update manager 102 may calculate how many new subscriptions need to be created and how much new traffic that will cause according to the type and size of the data to be communicated.

The update manager 102 may be further configured to determine current network conditions. For example, the update manager 102 may be configured to detect the current network load. Additionally or alternatively, the update manager 102 may be configured to calculate network throughput. Throughput represents the maximum data able to be transported from one node to another via the network 116. The update manager 102 may be configured to calculate network throughput as throughput=batch size/latency. The update manager 102 may be configured to determine the batch size based on the network protocol which the DCS 100 is using. For example, using the protocol OPC UA, which is based on UDP, which uses as underlying basis the IP protocol, batch size may be determined according to the transmission control protocol window as TCP Window=65,535 bytes×8=524,288 bits. The update manager 102 may be configured to measure the latency of the network by sending a ping to one or more other nodes 106. Assuming in the OPC UA example a latency of 2 ms, throughput may be calculated as 524,288/0.002/1,000,000=262.14 Mbps.

The update manager 102 may be configured execute a decision-making algorithm which takes as input the determined additional network load resulting from splitting the application and/or the determined current network conditions, and which applies one or more predetermined rules to decide whether the transfer is feasible, and/or to decide on a subsequent course of action, in order to avoid the publishing of more signals on the network having a negative impact.

For example, if the additional network load and network conditions are such that the transfer of the additional signals over the network 116 cannot be performed sufficiently quickly to ensure that the application is still operational, the update manager 102 may recommend or implement a return to the application splitting step such that the deployment scheme may be changed. Alternatively, the update manager 102 may suggest not to split the application.

To determine whether the application can remain operational, the update manager 102 may be configured to determine a slack time remaining for the transfer of the additional network load once an expected time to complete one or more predetermined other transfer-related tasks has been deducted from the cycle time of the application. Continuing with the OPC UA example, a cycle time of 80 ms would provide a network throughput of 20.97 Mb per 80 ms. This represents an idealized scenario because the whole cycle time cannot be spent transferring the additional network load. The update manager 102 may therefore be configured to deduct from the cycle time the expected time to complete one or more predetermined other transfer-related tasks such as retrieving the memory state from the source engine 112-1 and serializing it (e.g., 20 ms), de-serializing that data and writing it to the target engine (e.g. 15 ms), creating the connections to the source engine and the target engine (e.g. 6 ms for each connection), and so on. The remaining slack time is available for transferring the additional network load. In the OPC UA example, 33 ms remain to transfer the additional network load, which would be enough time to transfer 8.6 Mb.

In a further example of applying a predetermined rule, the update manager 102 may be configured to delay the transfer, or to recommend delaying the transfer, in response to the detected network load exceeding a specific threshold (e.g., 70% of its capacity).

If the output of the decision-making algorithm is that the transfer is feasible, the method proceeds to step 204.

In step 204 of FIG. 2, the method then proceeds with the updating of the deployed parts of the application such that each state part matches that of the corresponding part of the state 110-1 of the source application 108-1, or includes predetermined deviations from the source application 108-1 intentionally introduced by e.g. the engineer 120. To begin the update process, the update manager calculates the number m of execution engines 112 on the target nodes 106 which can be updated in parallel. This number may be referred to herein as the batch size, and the m state parts to be transferred may be collectively referred to as a batch or chunk.

To this end, the update manager 102 calculates the size of each state part to be transferred over the network 116. The size may be calculated in e.g. kB or may be derived from, or represented by, the number of variables to be updated. The variables to be updated may comprise all or a predetermined subset of the variables used by a particular application part to be updated. Alternatively, only those variables may be updated in relation to which there is a mismatch in output between the respective application part and the corresponding part of the source application 108-1, detected for example by comparing the current values of the state 110 in each of the sending and receiving execution engines 112. In other words, the update manager 102 may be configured to identify variables to be transferred by detecting discrepancies in the states of the application parts running on the target nodes 106 compared to the state 110-1 of the source application 108-1. In this regard, the update manager 102 is configured to obtain the states of the applications for example by reading them out. In particular, the update manager 102 is configured to determine both the state 110-1 of the source application 108-1 and that of each application part running on a receiving execution engine.

The update manager 102 is further configured to determine the available network capacity. For example, the update manager 102 may be configured to determine latency and/or bandwidth of the network 112 (e.g., max 3 ms latency, 83% of 1 Gbps available), calculated for example on the basis of a ping sent to one or more of the nodes 106.

The update manager 102 is further configured to determine the cycle time of the source application 108-1. This may be known or may be measured by the update manager 102.

Based on the size of the state parts to be transferred and the available network capacity, the update manager 102 calculates how many execution engines 112 can be updated in parallel during one execution cycle, such that the cycle time of the application can be met. It may be the case that the entire update process can be completed within one execution cycle. For applications with short cycle times, however, it is more likely that the update process will require multiple execution cycles to complete, with one application state part or a batch of application state parts being transferred during each execution cycle. The selection as to which state parts are to be transferred during the next execution cycle and the other in which the application parts are to be updated is non-critical in view of the state parts relating to isolated parts of the source application.

To provide further assurance that the cycle time can be met, the update manager 102 may be configured to determine the slack time (i.e., that part of the execution cycle remaining following processing tasks) and to take the determined slack time into account in the calculation of how many execution engines 112 can be updated during the next execution cycle. The slack time may be affected by the computation time needed by the source application 108-1 to provide its output following the start of the cycle, and/or by the computation time needed by the update manager 102 to perform the above-described calculation. For example, for an execution cycle lasting 500 ms, the source application 108-1 may need 50 ms to calculate its output. Hence, 450 ms slack time remain to transfer the application state parts before the next execution cycle begins (assuming that the update manager 102 performs its calculations within the same 50 ms period). The slack time imposes a threshold on the number of application parts which can be updated within one execution cycle. The update manager 102 may therefore calculate how many nodes 106 can be updated in parallel based on the threshold imposed by the slack time, rather than the full cycle time.

The results of the calculation performed in step 204 are optionally displayed to the engineer 120 for approval. For example, the update manager 102 may provide the results in the form of an indication of which variables of the source application state 108-1 need to be transferred and to which node 106. Alternatively, only selected variables may be shown for comparison. These values may be selected by the engineer 120. Mismatching variables may be shown in a live-updating fashion. The results may be shown to the engineer 120 for example in the form of a table, especially by highlighting the differences between the application states on the different nodes. This enables the engineer 120 quickly to determine whether the state transfer makes sense or whether too many differences exist. The engineer 120 may then validate the results and approves the transfer over node boundaries.

Figure 3A:
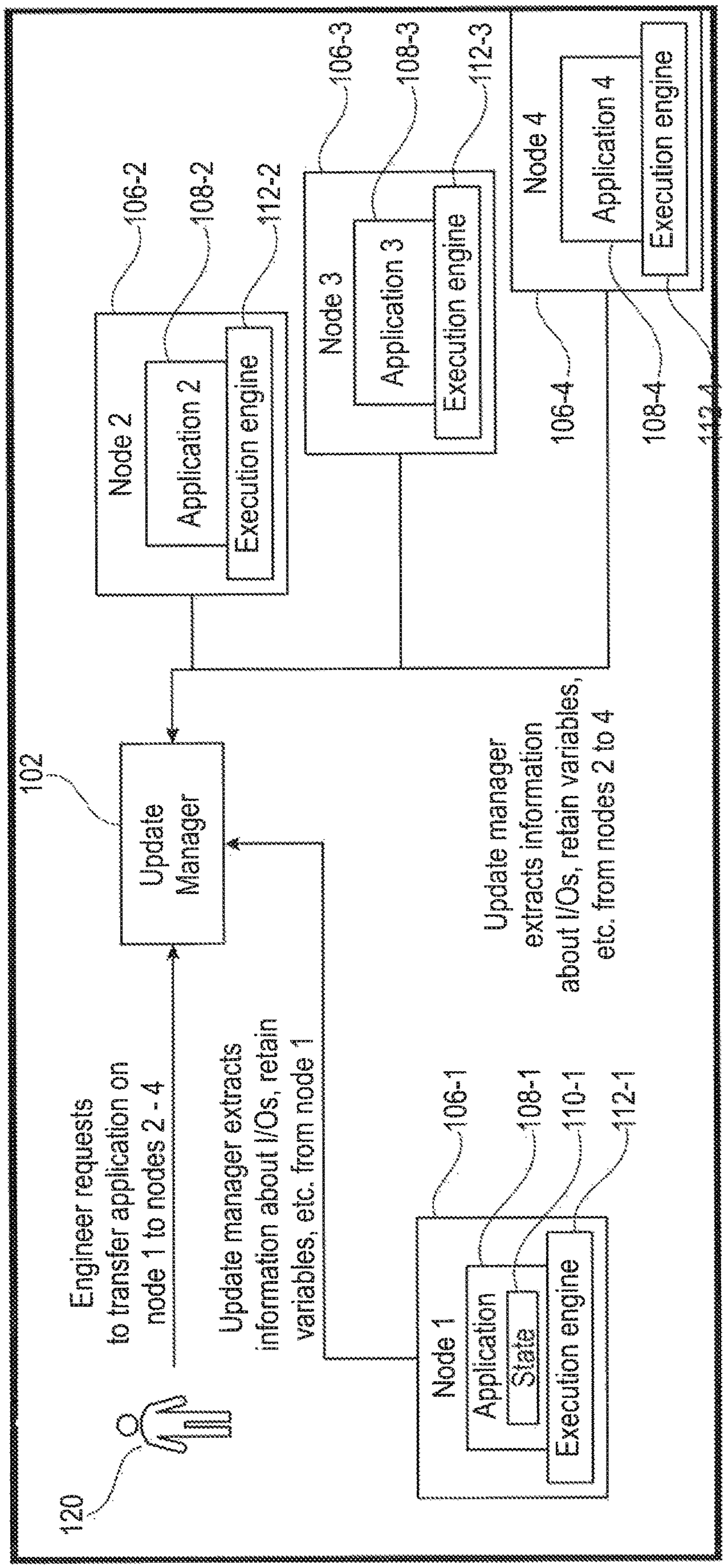
FIGS. 3A-3G illustrate various stages of the method of FIG. 2.
Figure 3B:
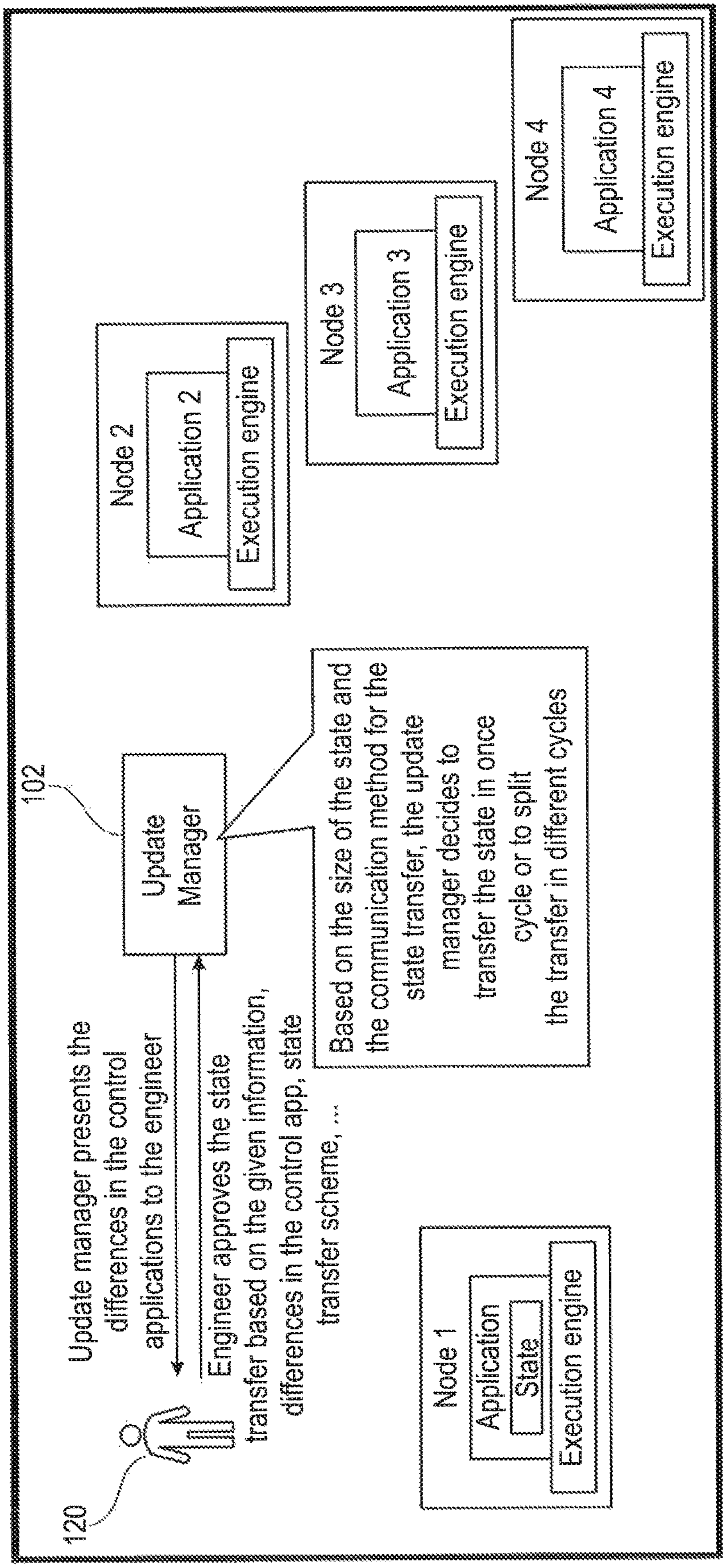

FIGS. 3A and 3B illustrate some of the above-described steps of the update management method. In FIG. 3A, the engineer 120 requests a transfer of the application from the source node 106-1 to target nodes 106-2, 106-3, and 106-4. In this example, the deployment scheme is a 1-to-3 deployment scheme, in which the source application 108-1 running on the source execution engine 112-1 at the source node 106-1 has been split into three parts 108-2, 108-3, 108-4, with those parts having been deployed respectively to the target (receiving) nodes 106-1, 106-2, 106-3, each having a respective execution engine 112-2, 112-3, 112-4. Although three target nodes are shown in this example, it will be appreciated that the number may vary in other examples. The update manager 102 is shown reading out the state 110-1 of the source application 108-1 and those of the deployed application parts 108-2, 108-3, 108-4, in order to calculate the batch size, as described above. In FIG. 3B, the update manager 102 presents the results to the engineer 120, who approves the transfer.

In step 205 of FIG. 2, once the determination has been made as to how many execution engines 112 are to be updated during the next execution cycle, the update manager 102 pauses the execution engine 112-1 at the source node 106-1 while retrieving the state 110-1 of the source application 108-1. The execution engine 112-1 may be paused within the slack time so as to retrieve the state 110-1. Although the source application 108-1 should remain idle for the rest of the execution cycle once it has calculated the outputs for the current execution cycle, it is nonetheless desirable to pause execution engines when reading or writing application states such that this may be done reliably, without other events interfering and causing write/read conflicts.

In step 206, the update manager 102 extracts the parts of the source application state 110-1 which are relevant for the update of the first m execution engines. The relevant parts are those parts of the application state 110-1 which correspond to the parts of the application that were deployed to the target nodes 106 and which are to be updated during the next execution cycle. The application state 110-1 may thus be separated out into different packages i.e. state parts for transfer to respective target nodes 106.

In case the deployment scheme was provided and implemented by the engineer 120, the update manager 102 may analyze both the source application 108-1 and the application parts 108-2, 108-3, 108-4 running on the receiving nodes using the same techniques as described above in order to determine the strength of the coupling between those application parts. For example, the update manager 102 may undertake static code analysis of the 61131 control code of the source application 108-1 and compare that with the results of a similar analysis of the application parts 108-2, 108-3, 108-4. The purpose is to identify which parts of the application state can be transferred independently of each other, i.e., which application state parts need to be transferred in the same batch or which parts may appear in different batches in an iterative update process. This analysis is not time-critical and may be performed prior to the transfer, i.e., prior to step 204, due to its complexity. The update manager 102 need not stop or pause the execution engines 112 for this analysis.

Figure 3C:
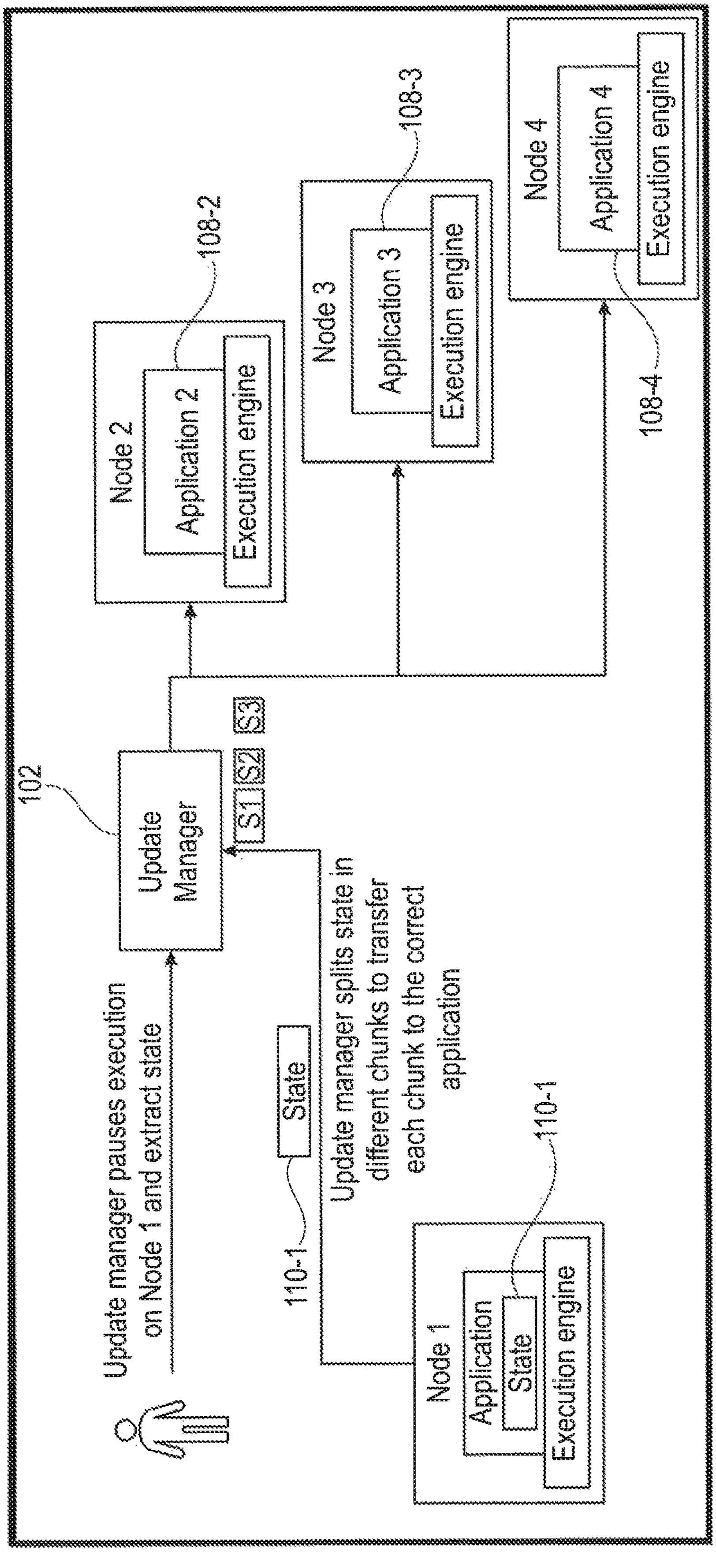

FIG. 3C shows the update manager 102 retrieving the state 110-1 of the source application 108-1 and extracting the parts S1, S2, and S3 of that state to be transferred respectively to the three application parts 108-2, 108-3, and 108-4, in the case that all three state parts can be transferred during one execution cycle.

In step 207, the update manager 102 updates the m execution engines 112. This may comprise pausing the m execution engines 112 while writing the transferred application state parts to those engines. In case network resource reservations are possible (e.g., using Ethernet/TSN or other means to introduce QoS guarantees for network traffic), the update manager 102 may set up reservations for the transfers to the separately deployed parts of the application. In this way, deterministic upper bounds for network delays can be achieved.

Figure 3D:
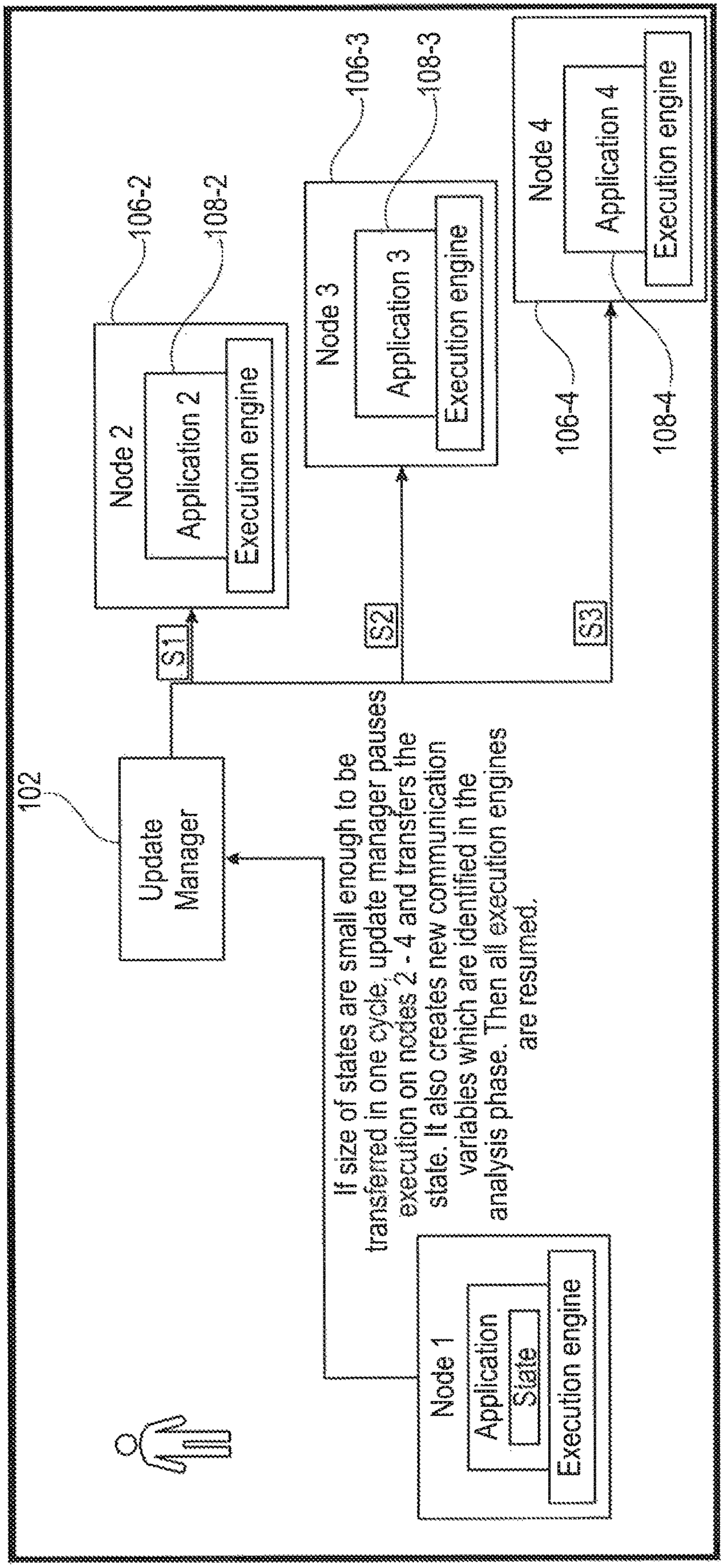

FIG. 3D shows the three application state parts S1, S2, and S3 being transferred respectively to the target nodes 106-2, 106-3, and 106-4 for updating the application parts 108-2, 108-3, and 108-4, respectively, in the case that all three state parts can be transferred during one execution cycle.

Figure 3E:
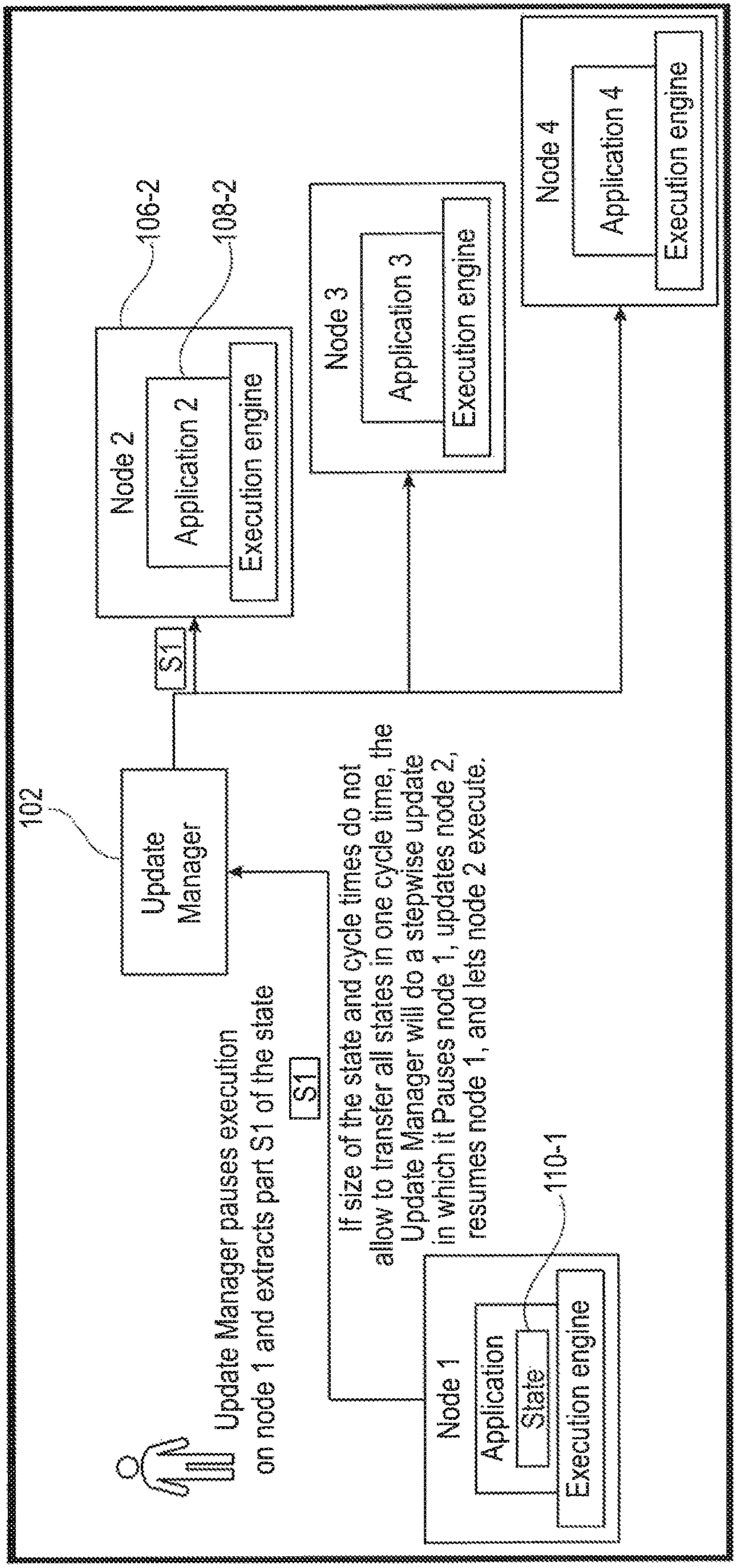
Figure 3F:
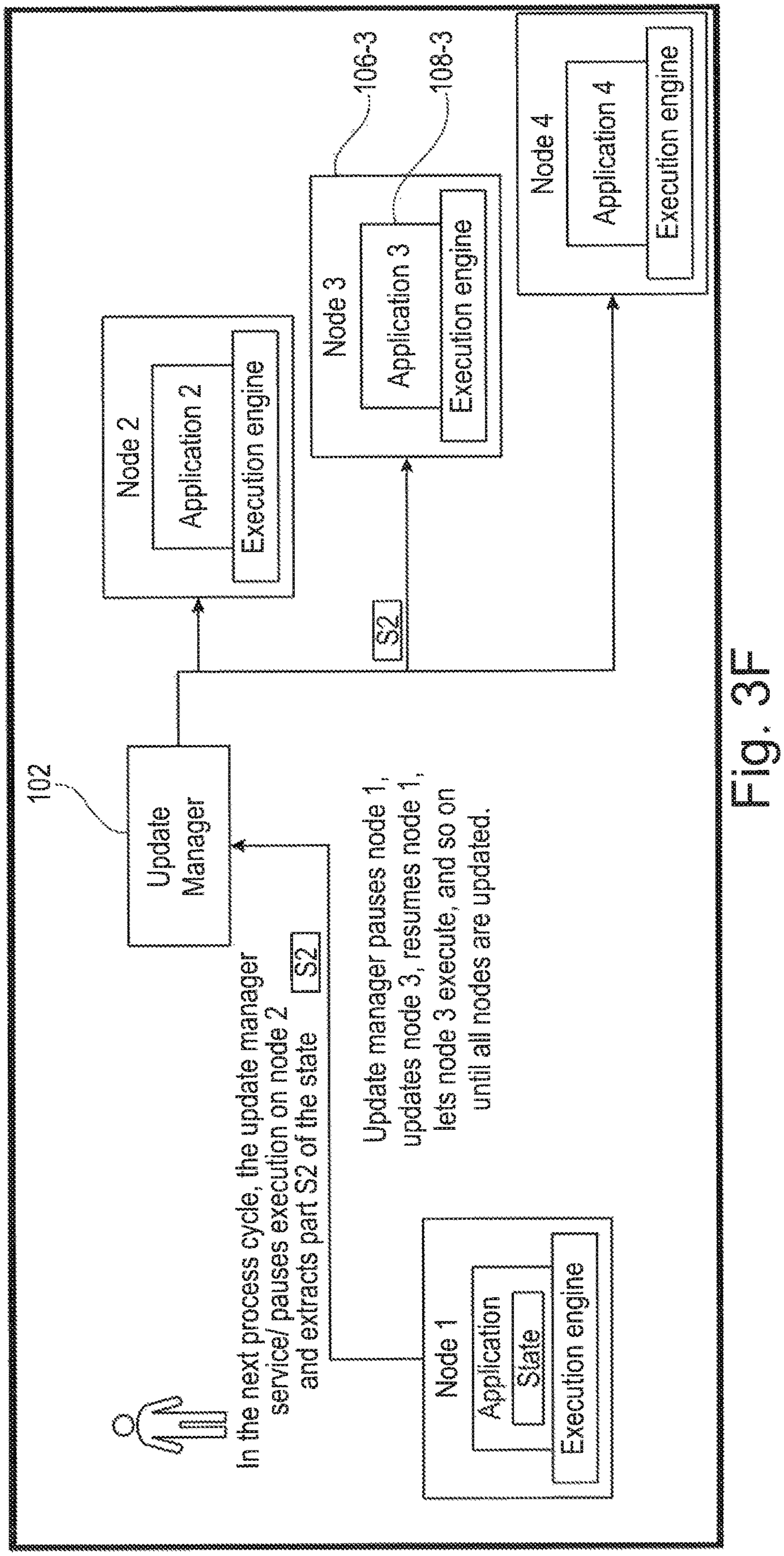

Conversely, FIGS. 3E and 3F illustrate the scenario in which only one state part can be transferred per execution cycle. As shown in FIG. 3E, in one execution cycle, the update manager 102 extracts only the first state part S1 from the state 110-1 of the source application 108-1, and transfers it to the target node 106-2 for updating the application part 108-2. As shown in FIG. 3F, during the next execution cycle, the update manager 102 extracts only the second state part S2 and transfers it to the target node 106-3 for updating the application part 108-3. This process is repeated until all application parts have been updated.

Figure 3G:
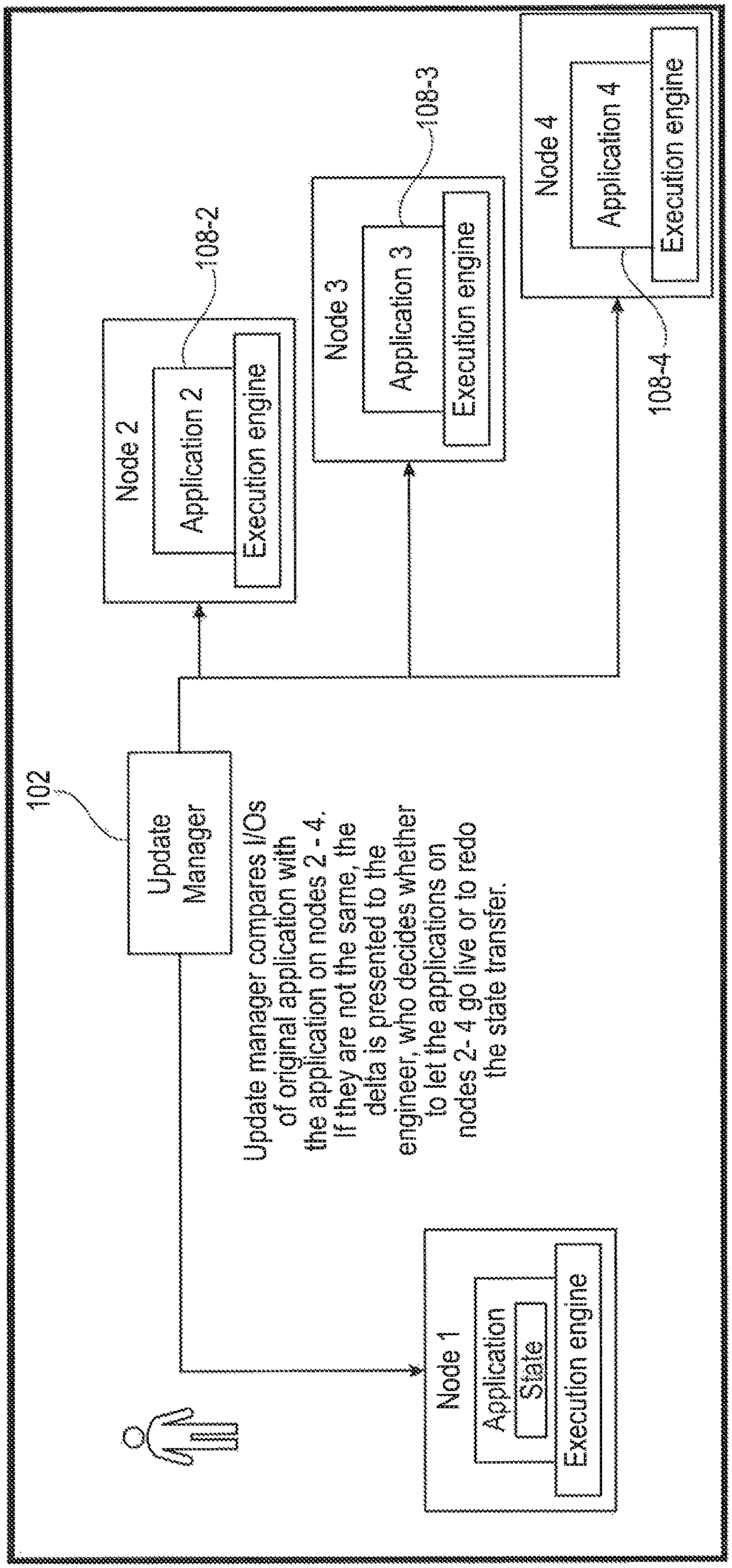

FIG. 3G illustrates the stage of the method in which the three application state parts S1, S2, and S3 have been used to update the application parts 108-2, 108-3, and 108-4, respectively. The next steps of the update management method are as follows.

In step 208, the update manager 102 optionally presents outputs of the m execution engines 112 to the engineer 120. The update manager 102 may show a summary of the inputs and outputs from the source and target engines 112 to the engineer for visual comparison. The update manager 102 may determine whether there is a delta in the outputs of the deployed application parts 108-2, 108-3, 108-4 relative to that of the source application 108-1. If there is a delta, the update manager 102 displays the delta to the engineer 120. Steps 208 and 209 may be omitted in response to a determination that the m outputs are identical to the outputs of the source application 108-1.

In step 209, the update manager 120 receives input from the engineer 120 indicating whether the delta is accepted. If the delta is accepted, the method proceeds to step 210. Otherwise, the state transfer to update the m execution engines 112 is repeated by returning to step 205.

In step 210, the update manager 102 switches the output signals of the m execution engines 112 into production and disables the corresponding output signals in the source execution engine 112-1. Subsequently, the source execution engine 112-1 runs the remaining part of the source application 108-1 in parallel to the deployed application parts 108-2, 108-3, 108-4.

In step 211, the update manager 102 initiates the update process for the next batch of application parts by returning to step 204 for the next execution cycle. The next batch may comprise the remaining n-m application parts, or a subset thereof if the transfer cannot be complete in the next execution cycle. The update process proceeds iteratively in this way until all parts of the application have been updated, or until a predetermined minimum number of parts necessary for satisfactory operation has been updated.

In addition to the supervised mode of operation described above, in which the engineer provides input in the form of e.g. the transfer request, approval of the deployment scheme, approval of the transfer, and so on, the present disclosure further envisages an unsupervised mode in which the update manager (or any automated entity such as the L-E-G management node 104 or an orchestration manager) performs everything without any interaction with the engineer 120, or with only reduced or minimal interaction. To this end, the entity performing the method may operate according to predetermined rules or criteria for decision making. For example, the threshold which a delta in the outputs of the deployed application parts should not exceed may be predefined to ensure a functionally correct behavior of the application.

According to the present disclosure, there is therefore proposed a system and method to deploy software applications to different hosts without stopping them. The system may automatically take care of the additional requirements introduced by the target hardware and network. The engineer can visualize how the application would perform to validate its outputs.

The above-described software components may be executed in software containers (e.g., Docker, rkt, LXD). The containers may be managed by a container orchestration engine (e.g., Kubernetes, Docker Swarm, Nomad). This provides flexibility in handling software images, allows better versioning, and enables easy scaling of instances.

Figure 4:
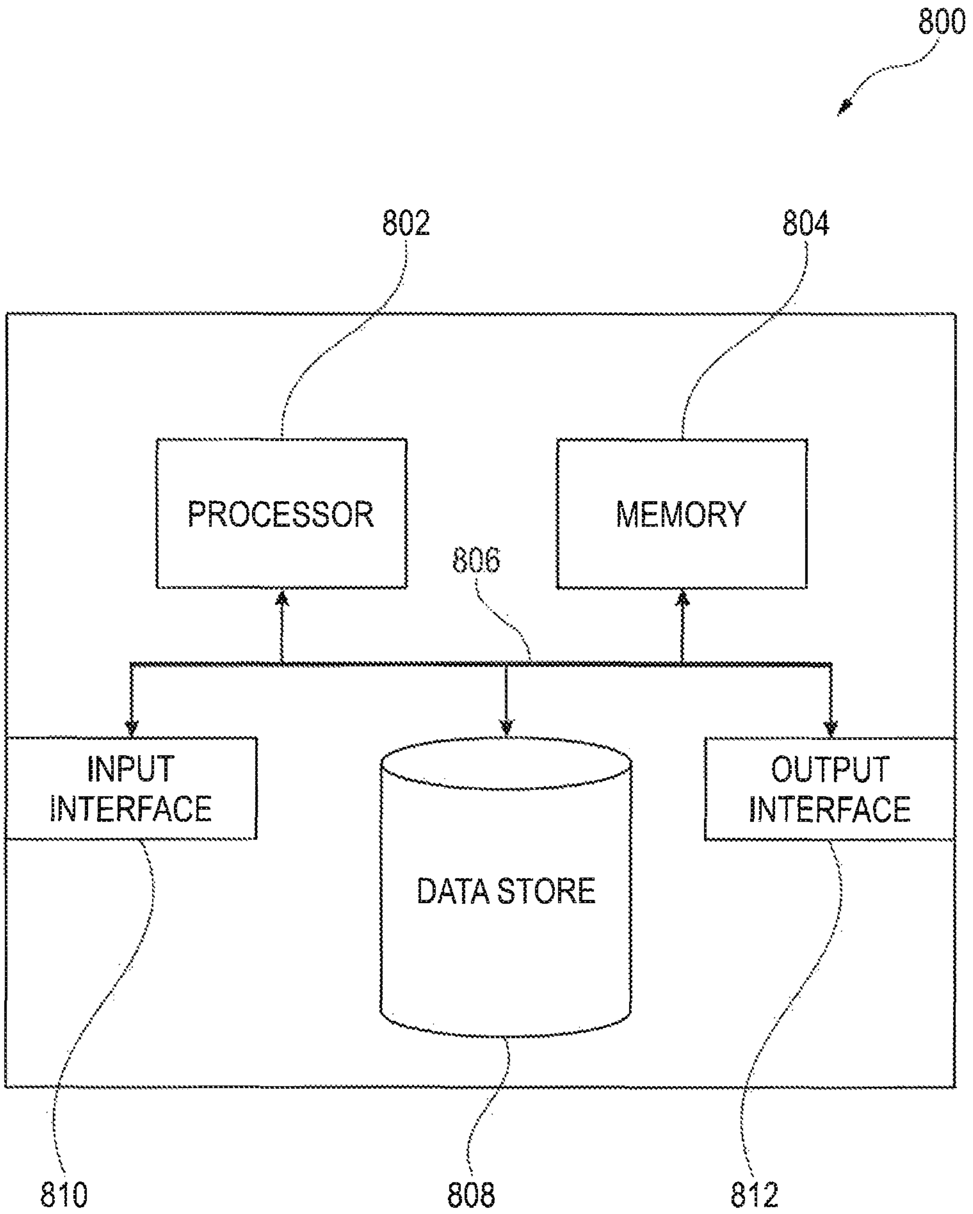
FIG. 4 illustrates a computing device in accordance with the systems and methods disclosed herein.

Referring now to FIG. 4, a high-level illustration of an exemplary computing device 800 that can be used in accordance with the systems and methodologies disclosed herein is illustrated. The computing device 800 includes at least one processor 802 that executes instructions that are stored in a memory 804. The instructions may be, for instance, instructions for implementing functionality described as being carried out by one or more components discussed above or instructions for implementing one or more of the methods described above, in particular the update manager and the update management method. The processor 802 may access the memory 804 by way of a system bus 806. In addition to storing executable instructions, the memory 804 may also store conversational inputs, scores assigned to the conversational inputs, etc.

The computing device 800 additionally includes a data store 808 that is accessible by the processor 802 by way of the system bus 806. The data store 808 may include executable instructions, log data, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features.

It has to be noted that embodiments of the invention are described with reference to different categories. In particular, some examples are described with reference to methods whereas others are described with reference to apparatus. However, a person skilled in the art will gather from the description that, unless otherwise notified, in addition to any combination of features belonging to one category, also any combination between features relating to different category is considered to be disclosed by this application. However, all features can be combined to provide synergetic effects that are more than the simple summation of the features.

While the invention has been illustrated and described in detail in the drawings and foregoing description, such illustration and description are to be considered exemplary and not restrictive. The invention is not limited to the disclosed embodiments. Other variations to the disclosed embodiments can be understood and effected by those skilled in the art, from a study of the drawings, the disclosure, and the appended claims.

The word “comprising” does not exclude other elements or steps.

The indefinite article “a” or “an” does not exclude a plurality. In addition, the articles “a” and “an” as used herein should generally be construed to mean “one or more” unless specified otherwise or clear from the context to be directed to a singular form.

A single processor or other unit may fulfil the functions of several items recited in the claims.

The mere fact that certain measures are recited in mutually different dependent claims does not indicate that a combination of these measures cannot be used advantageously.

A computer program may be stored/distributed on a suitable medium, such as an optical storage medium or a solid-state medium supplied together with or as part of other hardware, but may also be distributed in other forms, such as via the internet or other wired or wireless communications systems.

Any reference signs in the claims should not be construed as limiting the scope.

Unless specified otherwise, or clear from the context, the phrase “A and/or B” as used herein is intended to mean all possible permutations of one or more of the listed items. That is, the phrase “X comprises A and/or B” is satisfied by any of the following instances: X comprises A; X comprises B; or X comprises both A and B.

In one general aspect, the present disclosure describes a more flexible update mechanism for stateful applications than is currently known. According to a first aspect, there is provided a computer-implemented update management method for managing the transfer of an application state of an application from a source node to at least one target node of a distributed control system. The method comprises identifying a first part of the application state which can be transferred independently of a second part of the application state; determining that the first part can be transferred from the source node to the at least one target node during one execution cycle of the application; performing a first partial update by transferring the first part of the application state from the source node to the at least one target node during a first execution cycle of the application; and performing a second partial update by transferring the second part of the application state from the source node to the at least one target node during a second, subsequent execution cycle of the application.

According to the present disclosure, the application may be split to create a plurality of decoupled parts which are able to operate independently of each other. In this way, the invention provides for scaling of the application to enable it to run on separate nodes, to enable updates over node boundaries, and to provide for more flexible deployment of applications. Each part of the application may be associated with a corresponding part of the application state of the application. The at least one part of the application state which can be updated independently of the remainder of the application state may thus be identified on the basis of its correspondence to a said decoupled part of the application. The method may comprise splitting the application to create the decoupled parts. Splitting the application may comprise analyzing engineering data relating to the application to identify the parts which can be decoupled. The engineering data may comprise a graphic and/or narrative representation of the control logic of the application and/or its program code, especially the structured control code of the application. Identifying parts of the application which can be decoupled may comprise identifying parts of the control logic and/or code which are to some predetermined degree independent of each other, i.e. the strength of the coupling or the degree of interdependency between the parts satisfies predetermined criteria.

Identifying parts of the application which can be decoupled may be performed using static analysis, e.g. static code analysis. Identifying parts of the application which can be decoupled may comprise identifying global and/or local variables, the latter being variables used by different subsystems of the distributed control system. Splitting the application may comprise using the local variables to identify splitting points. Splitting the application may comprise using additional variables to represent the global variables of the control logic, in the case that complete decoupling cannot be achieved. The method may comprise determining an additional load resulting from the use of the additional variables. The additional load may comprise additional network load and/or additional compute load at one or more target nodes. The method may comprise providing an alert in response to the additional load failing to meet predetermined criteria, e.g. a threshold above which the additional load is considered disadvantageous. The alert may be used to refrain from splitting the application, and/or to delay splitting the application, and/or to recommend not splitting the application. The method may comprise determining current network conditions, for example current network load and/or network throughput. The method may comprise determining whether the application can remain operational, based on the additional network load and/or the determined current network conditions. Determining whether the application can remain operational may comprise calculating a slack time remaining for the transfer of the additional network load. The method may comprise delaying the transfer, or to recommending delaying the transfer, in response to the detected network load exceeding a specific threshold. The method may further comprise writing back changes resulting from the splitting of the application to the engineering data, e.g., writing back the changed control logic.

The method may comprise deploying the decoupled parts to the at least one target node. The decoupled parts may be executed in parallel with the source application (i.e., the original application) executing on the source node. The decoupled parts may be deployed to target nodes in such a way that a given decoupled part is deployed to only one respective target node, that a given decoupled part is deployed to more than one target node, or that multiple decoupled parts are deployed to a single target node. The association between decoupled parts and target nodes is referred to herein as a deployment scheme. The method may comprise determining the deployment scheme. Determining the deployment scheme may comprise selecting target nodes to which the decoupled parts are to be deployed. The selection may be made on the basis of available compute resources at the target nodes (e.g., processor or memory resources, i.e., CPU or RAM), for example to implement load balancing among nodes, to minimize (any increase in) network traffic, or to control application size, for example in order to facilitate maintenance.

By determining that the at least one part can be transferred from the source node to the at least one target node during one execution cycle of the application, before any other independent part is transferred, the invention is able to guarantee that the cycle time of the application can be met, although the overall transfer may take longer. The determination may comprise calculating a maximum amount of data which can be transferred via a network connecting the source node to the at least one target node within one execution cycle. Calculating the maximum amount of data may comprise obtaining data relating to conditions in the network, the conditions comprising for example one or more of network capacity, load, latency, bandwidth, and so on, and performing the calculation on the basis of that data. The determination may comprise obtaining data defining a size of the at least one part to be transferred. The determination may comprise calculating that size. The size may comprise the size and/or number of every variable in the at least one part, or a size and/or number of variables in the least one part in relation to which discrepancies are identified between the application running on the source node and the at least one part of the application running on the at least one target node. The method may comprise identifying those discrepancies on the basis of application states retrieved or read out from the source node and target node(s). The determination may comprise determining that more than one said part of the application may be transferred in parallel during one execution cycle. This determination may be made on the basis of the maximum amount of data that may be transferred within one cycle and the sizes of the multiple parts. The method may thus comprise identifying a batch of parts of the application state to be transferred in parallel from the source node to one or more target nodes. Calculating the maximum amount of data may comprise taking into account compute time in order to determine a slack time during which the transfer is to be carried out. The compute time may comprise the time taken for the source application and/or the update manager to perform computations whose output is relevant to the transfer.

The method may comprise transferring parts of the application state individually during respective, consecutive execution cycles and/or transferring multiple parts in parallel during a single execution cycle. Multiple state parts transferred in parallel may be referred to as a batch or chunk. The act of transferring multiple parts in parallel during one execution cycle may be referred to as batch transfer. The transfer may involve transferring a first batch of application state parts during one cycle, a second batch of parts during another cycle, and so on. The transfer of single parts or batches of parts during respective execution cycles may be performed iteratively until all parts of the application have been transferred, or at least until a predetermined subset of those parts has been transferred, for example a predetermined minimum subset that is necessary for producing acceptable results at the target node(s). Performing the transfer may comprise issuing resource reservations for reserving e.g. network and/or compute resources necessary for performing the transfer.

The method may comprise validating the transfer. The transfer may be validated automatically according to predetermined criteria or manually by outputting information for approval by the engineer. Validating the transfer may comprise comparing the outputs produced by one or more deployed parts of the application with the corresponding output produced by the source application. In the case that a difference exists between those outputs—referred to herein as a delta—that delta may be accepted automatically according to predetermined criteria (such as thresholds for absolute or relative values or similarity metrics, and so on), or manually, by outputting the delta for acceptance by the engineer. If a delta for a particular deployed part of the application is not accepted, the transfer of that part may be repeated. If the delta is accepted, a switchover to that part may be performed. In this way, it may be ensured that the transferred application parts do not run with an unacceptably wrong state.

Performing a switchover to a particular part of the application may comprise using the output signals of that part for controlling the industrial process. Performing the switchover may further comprise disabling or ignoring corresponding output signals of the source application. Once all necessary application parts have been transferred, performing the switchover may comprise deleting or de-installing the source application.

The present disclosure therefore provides an online update mechanism for control applications running in containerized environments on different physical nodes, allowing partial updates of application and/or splitting of applications onto different nodes. According to the present disclosure, state transfer may be performed even if a full transfer is not possible within one cycle time by accepting a given delta in the input/output signals of the split and deployed application. The present disclosure provides for auto-scaling of applications to make them smaller so as to let them run on separate nodes, enabling updates of applications over physical node boundaries and more flexible deployment of applications. Optimized deployment of control applications to different nodes (e.g., 1-to-n) may be provided considering different requirements like load balancing in the sense of CPU or RAM, network traffic or control application size (to maintain applications more easily, etc.).

An "application" as referred to herein may be in particular a stateful, containerized application, and may also be referred to as a control (logic) application, or a process automation application.

By "transfer" is meant herein that a state of one application, or a part of that state, is overwritten with the state of another application, or part of the state of that other application.

"Updating" as used herein refers to this process of overwriting the state.

By "deploy" is meant that an application or part of an application is installed to run on the execution engine of a node, or that the node is instructed to implement the control logic of that application or part. "Deployed" is used herein to refer to an application or part of an application so deployed, but especially to those parts of a split source application which execute on respective target nodes in parallel with the execution of the source application on the source node.

According to a second aspect, there is provided a computing device comprising a processor configured to perform the method of the first aspect.

According to a third aspect, there is provided a computer program product comprising instructions which, when executed by a computing device, enable or cause the computing device to perform the method of the first aspect.

According to a fourth aspect, there is provided a computer-readable medium comprising instructions which, when executed by a computing device, enable or cause the computing device to perform the method of the first aspect.

The invention may include one or more aspects, examples or features in isolation or combination whether or not specifically disclosed in that combination or in isolation. Any optional feature or sub-aspect of one of the above aspects applies as appropriate to any of the other aspects.

These and other aspects of the invention will be apparent from and elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented update management method for managing the transfer of a stateful application state of a stateful application from a source node to at least one target node of a distributed control system, the method comprising:

identifying using a computer a first part of the stateful application state which can be transferred independently of a second part of the stateful application state;

wherein the stateful application is executed cyclically by a runtime environment, wherein the runtime environment periodically receives input signals from one or more field devices, executes a control algorithm on the input signals to generate output signals, and sends the output signals to the one or more field devices within one execution cycle, retrieving the stateful application state from the stateful application operating on the source node, extracting the first part of the stateful application state from the stateful application state retrieved from the source node;

calculating a size of the first part of the stateful application state;

determining using the computer that the first part can be transferred from the source node to the at least one target node within a remaining slack time interval during one execution cycle of the stateful application based on the size of the first part of the stateful application state as calculated and currently available network capacity;

performing using the computer a first partial update by transferring the first part of the stateful application state from the source node to the at least one target node during a first execution cycle of the stateful application;

extracting the second part of the stateful application state from the stateful application state retrieved from the source node; and performing using the computer a second partial update by transferring the second part of the application state from the source node to the at least one target node during a second, subsequent execution cycle of the stateful application;

wherein transferring the first part of the application state during the first execution cycle is carried out over a dedicated or reserved communication channel with a predefined Quality-of-Service guarantee; and wherein the first part is transferred from the source node while execution of the stateful application continues in parallel, pausing only within the slack time interval.

2. The method of claim 1, further comprising splitting the stateful application to create a plurality of decoupled parts which are able to operate independently of each other, each decoupled part being associated with a corresponding part of the application state.

3. The method of claim 2, wherein splitting the stateful application comprises analyzing engineering data relating to the application to identify the parts which can be decoupled.

4. The method of claim 2, wherein splitting the stateful application comprises using local and/or global variables in control logic of the application to identify splitting points.

5. The method of claim 2, wherein splitting the stateful application comprises using additional variables to represent global variables of control logic.

6. The method of claim 5, further comprising determining an additional load, wherein the additional load comprises one or more of additional network load and additional compute load at the at least one target node, resulting from the use of the additional variables, and applying one or more predetermined rules for decision making to decide whether the transfer is feasible in response to the detected network load exceeding a specific threshold.

7. The method of any claim 2, further comprising determining a deployment scheme indicating selected target nodes to which the decoupled parts are to be deployed, and deploying the decoupled parts according to the determined deployment scheme.

8. The method of claim 1, wherein determining that the first part of the stateful application state can be transferred from the source node to the at least one target node during one execution cycle of the stateful application comprises identifying a batch of parts of the stateful application state which can be transferred in parallel from the source node to one or more target nodes during that execution cycle.

9. The method of claim 8, further comprising determining the number of parts of the stateful application state to be transferred in parallel as part of the batch based on a size of one or more of the parts of the stateful application state and available network capacity.

10. The method of claim 9, wherein determining the number of parts of the stateful application state comprises taking into account compute time in order to determine a slack time during which the transfer is to be carried out.

11. The method of claim 8, further comprising transferring a first batch of stateful application state parts during the first execution cycle, and a second batch of parts of the stateful application state during the second execution cycle.

12. The method of claim 1, further comprising comparing outputs produced by one or more deployed parts of the stateful application executing on respective target nodes with corresponding output produced by the application at the source node to identity a delta in the output of the application as deployed, and switching over to the one or more deployed parts of the stateful application state, if the result of the comparison are acceptable.

13. Non-transitory computer media containing computer-executable instructions that, when executed by a computer, perform the following functions for managing a transfer of a stateful application state of stateful application from a source node to at least one target node of a distributed control system:

identify a first part of the stateful application state which can be transferred independently of a second part of the stateful application state;

retrieving the stateful application state from the stateful application operating on the source node, wherein the stateful application is executed cyclically by a runtime environment, wherein the runtime environment periodically receives input signals from one or more field devices, executes a control algorithm on the input signals to generate output signals, and sends the output signals to the one or more field devices within one execution cycle, extracting the first part of the stateful application state from the stateful application state retrieved from the source node;

calculating a size of the first part of the stateful application state;

determine that the first part can be transferred from the source node to the at least one target node within a remaining slack time interval during one execution cycle of the stateful application based on the size of the first part of the stateful application state as calculated and currently available network capacity;

perform a first partial update by transferring the first part of the stateful application state from the source node to the at least one target node during a first execution cycle of the stateful application;

extracting the second part of the stateful application state from the stateful application state retrieved from the source node; and perform a second partial update by transferring the second part of the stateful application state from the source node to the at least one target node during a second, subsequent execution cycle of the stateful application;

wherein transferring the first part of the application state during the first execution cycle is carried out over a dedicated or reserved communication channel with a predefined Quality-of-Service guarantee; and wherein the first part is transferred from the source node while execution of the stateful application continues in parallel, pausing only within the slack time interval.

14. The computer media of claim 13, further comprising instructions for splitting the stateful application to create a plurality of decoupled parts which are able to operate independently of each other, each decoupled part being associated with a corresponding part of the stateful application state.

15. The computer media of claim 13, wherein splitting the stateful application comprises executing instructions for analyzing engineering data relating to the application to identify the parts which can be decoupled.

16. The computer media of claim 14, wherein splitting the stateful application comprises instructions for using local and/or global variables in control logic of the application to identify splitting points.

17. The computer media of claim 14, wherein splitting the stateful application comprises instructions for using additional variables to represent global variables of control logic.

18. The computer media of claim 17, further comprising instructions for determining an additional load resulting from the use of the additional variables, and applying one or more predetermined rules to decide whether the transfer is feasible.

19. The computer media of claim 14, further comprising instructions for determining a deployment scheme indicating selected target nodes to which the decoupled parts are to be deployed, and deploying the decoupled parts according to the determined deployment scheme.

20. The computer media of claim 13, wherein determining that the first part of the stateful application can be transferred from the source node to the at least one target node during one execution cycle of the stateful application comprises instructions for identifying a batch of parts of the stateful application state which can be transferred in parallel from the source node to one or more target nodes during that execution cycle.

* * * * *